Oct. 28, 1947.  S. G. SAUNDERS ET AL  2,429,897
COMPOSITE STRUCTURE AND THE PROCESS OF MAKING THE SAME
Filed Oct. 17, 1944

INVENTORS
SEYMOUR G. SAUNDERS
AND HARRY MORRISON.
BY
ATTORNEYS

Patented Oct. 28, 1947

2,429,897

UNITED STATES PATENT OFFICE 2,429,897

COMPOSITE STRUCTURE AND THE PROCESS OF MAKING THE SAME

Seymour G. Saunders, Bloomfield Hills, and Harry Morrison, Detroit, Mich., assignors to Chrysler Corporation, Highland Park, Mich., a corporation of Delaware Application October 17, 1944, Serial No. 559,024

4 Claims. (Cl. 154—130)

This invention relates to an improved process of surface bonding together parts of a composite structure and to an improved bonded composite structure, this application being a continuation-in-part of, and substitution for, our applications Serial Nos. 354,230 and 447,374, filed August 26, 1940, and June 17, 1942, respectively.

More particularly, the invention pertains to the provision of an improved bond which is adapted to secure together parts comprising a wide variety of materials including metal, wood, plastics, fiber, glass, ceramics and the like in any selected combinations.

Heretofore, vulcanized rubber in layers of various thicknesses have been secured to surfaces of material of various kinds by initially treating the rubber surface to be attached with a cyclizing or isomerizing agent, such as sulphuric acid, and then applying various types of adhesives. In these bonding procedures, strengths of the resulting bonds have been limited by the relatively low cohesion between the particles of cyclized or isomerized rubber of the treated surface and the main vulcanized rubber body. As a result of this condition, bonds of the foregoing type have failed by separation of the cyclized surface film from the rubber body.

We have found that the cohesion between the particles of cyclized rubber of such a surface film and the rubber body, as well as the cohesion of the cyclized rubber particles to each other can be tremendously increased by the use of certain cement, hereinafter specified, and by suitably manipulating the rubber layer or body following the cyclizing treatment thereof in order to craze the treated surface for admitting the cement to the junction of the cyclized film and the rubber body. As far as can be determined, such cement is capable of penetrating the cyclized rubber film and curing under heat and pressure while in intimate contact with both the cyclized rubber particles and the rubber body.

One of the main objects of the invention is the provision of a bonding process by which parts of a composite article can be secured together with an ultimate tensile strength of the order of 1000 to 1200 pounds per square inch without requiring in the bonding operation compression of more than 15 to 25 pounds per square inch.

Another object of the invention is the provision of a water-proof bonding strata between parts of a composite structure which comprises water-insoluble material.

Other objects of the invention are to provide in a composite structure comprising rubber, a crazed bonding film consisting of cyclized rubber, the particles of which are tenaciously adhered together and to the uncyclized body portion of the rubber; to provide in a process for bonding rubber to diverse materials the step of crazing the cyclized rubber film by flexure in order to facilitate penetration of the cement to the junction of the cyclized and uncyclized rubber content and to provide in a composite structure of this kind a cement which is particularly adapted to penetrate and bond together the particles of the cyclized film in order to bond such film to the underlying uncyclized rubber as well as to tenaciously adhere to a large variety of materials.

Another object of the invention is the provision in a bond between parts of a composite structure of an intermediate yielding bonding layer that is adapted to accommodate, between such parts, controlled and resiliently opposed relative movement of sufficient amplitude to dissipate the impact of the separatory and other forces applied thereon and to distribute the effect of such forces over extended surface areas.

A further object of the invention is the provision of a bonding process of this character for selective control of the yielding properties of the intermediate bonding layer between wide limits varying from a substantially non-yielding rigid condition to a relatively yielding state.

Additional objects of the invention are to provide between bonded together bodies an intermediate bonding layer which has a main body portion comprising a vulcanized rubber compound or a synthetic rubber composition having physical characteristics similar to vulcanized rubber and having isomerized or cyclized rubber or synthetic rubber surface portions varying gradually in isomerized or cyclized rubber or synthetic rubber concentration from a maximum concentration of substantially pure isomerized or cyclized rubber or synthetic rubber at the exterior of the intermediate layer to a minimum concentration at the location internally of the vulcanized rubber or equivalent synthetic rubber layer and to provide a cyclized rubber crust-like surface on the intermediate bonding strata of a composite structure which blends by decreasing cyclized or isomerized rubber concentration into the body of the bonding strata without a sharp or abrupt line of demarcation and which is accordingly so integrally united with the body part of the bonding strata as to withstand parting from the latter under stresses less than those required to part the body portions.

Illustrative embodiments of the invention are shown in the accompanying drawings, of which:

Figure 1:
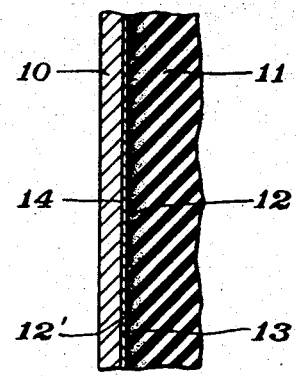
Fig. 1 is a sectional view diagrammatically illustrating a composite structure embodying the invention having as one of its parts a body of material or synthetic rubber-like material which is bonded to a rigid part or element comprising a different material.

The improved bonding process comprises a preparatory treatment of vulcanized rubber or equivalent synthetic rubber-like material in order to condition an exterior surface thereof to be adhered under the application of relatively low pressure and moderate temperature to a large variety of materials.

The cyclized rubber formation varies in cyclized rubber concentration from a maximum value of substantially pure cyclized rubber at its exterior to a minute concentration in the interior of the rubber body. This is accomplished by the in situ formation of cyclized rubber on the vulcanized rubber body or sheet and as a result, there is not present a line of demarcation between the body part of the rubber and the cyclized rubber formation for the latter gradually blends in decreased concentration into the body part of the rubber thus providing a substantially integral structure which will not separate or part from the rubber body under stresses less than those required to part portions of the rubber body itself.

After the rubber body or sheet-like rubber bonding layer has been treated in the foregoing manner, it may be readily bonded to a large variety of materials such as metal, wood, plastics, fiber, glass, ceramics, synthetic resinous materials and the like in any desired combinations. This is accomplished by flexing the treated rubber sheet in order to crack or craze the cyclized rubber film and then applying a suitable cement either to the isomerized surface of the rubber body or layer or to the surface of the article to be bonded thereto. The solvent of the cement is preferably eliminated by air drying or force drying in order to leave a deposit of unset cement and the parts are assembled in desired relation and heated to the temperature of the softening point of the cement which varies from 180° F. to 300° F. depending upon the nature of the cement employed. The parts are preferably compressed together under pressures of from substantially 15 to 25 pounds per square inch during the cement setting heat treatment.

The following cement has been found to produce exceptionally strong water resistant bonds between cyclized rubber films of vulcanized rubber bodies and a large variety of materials. This cement is particularly advantageous since it will penetrate the cyclized rubber films cohering the particles thereof together and to the uncyclized rubber content with great tenacity while at the same time adhering the cyclized rubber film to a large number of different substances. Bonds having from 1000 to 1200 pounds per square inch ultimate tensile strength have been obtained by using water-insoluble hydrolysis modified polyvinyl acetate resin in a mixture with heat reactive phenol formaldehyde resin. Modified polyvinyl acetate resin in solution in suitable solvents is available on the market under this nomenclature. It is a hydrolyzed polyvinyl acetate having a complex chain of inter-linked molecules. The structure of the modified polymer may be pictured as a long chain, the alternate links of which are vinyl alcohol and vinyl acetate units:

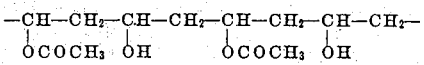

In general, the actual distribution of the alcohol and ester components in the chain depends on the chance hydrolysis of the ester group. The extent of hydrolysis determines its water solubility. Polyvinyl acetate which has been hydrolized, as indicated by the foregoing formula, to an extent such that not more than substantially 50 mole per cent of the acetyl groups thereof have been replaced by hydroxyl groups is not water soluble. The water resisting properties of the ultimate bond are thus increased by the use of a cement comprising water-insoluble hydrolized polyvinyl acetate resin and phenol formaldehyde resin. While polyvinyl acetate resin which has been hydrolized to 50 mole per cent is satisfactory, such resins which have been hydrolized to an extent as low as 14 mole per cent are also satisfactory. The hydrolization of the resin should be so limited as not to convert it to a water soluble state.

The hydrolysis modified polyvinyl acetate resin may be employed mixed in equal or any other desired proportions with heat reactive phenol formaldehyde resin cement. Crazing of the cyclized rubber film greatly increases the cohesion and adhesion resulting from the use of the above mentioned cement for the multiplicity of cracks thus formed in the cyclized coating admits the cement to the junction of the cyclized and uncyclized rubber portions.

Figure 2:
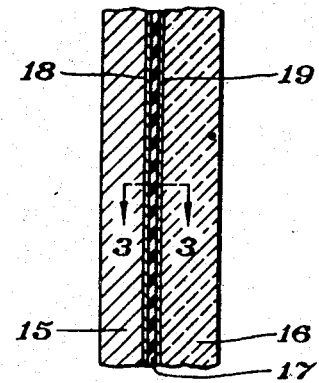
Fig. 2 is a sectional view similar to Fig. 1 diagrammatically illustrating a composite structure but having two parts which comprise diverse materials bonded together by an intermediate bonding layer embodying this invention.
Figure 4:
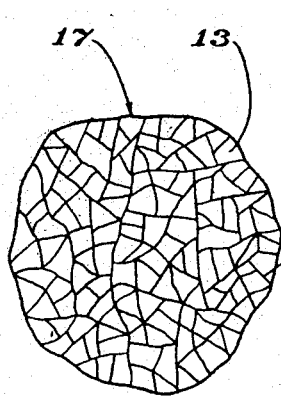
Fig. 4 is a fragmentary plan view of an intermediate bonding layer having a crazed cyclized surface.

For the purpose of illustrating an example, there is shown in Fig. 1 a layer of rigid material 10 which may comprise metal, wood, plastic, fiber, glass, ceramics, synthetic resin and the like to which is bonded a body 11 comprising vulcanized rubber. The surface 12 of the rubber body 11 which is secured to the member 10 is shown by stippling to have been isomerized by sulphuric acid or any other solution so as to produce a film 13 of cyclized rubber thereon and to have been crazed to produce a plurality of cracks 12' therein. The crazed condition of the cyclized film as it appears prior to assembly of the parts of the structure is illustrated in Fig. 4 in which the cracks produced by flexure of the rubber sheet or body are designated by the numeral 12'. The side of the rubber body 11 adjacent the member 10 is bonded to the latter member by a film 14 of set cement, the cement having penetrated the cyclized film and entered the cracks thereof. In Fig. 2 of the drawings is illustrated a composite structure comprising two members 15 and 16 each of which may comprise any of the above mentioned materials or they may comprise the same material. The members 15 and 16 are bonded together by an intermediate bonding layer 17 of sheet-like thickness comprising vulcanized rubber, the opposite sides of which have been subjected to an isomerizing action in order to produce thereon in situs formed integrally connected films of cyclized rubber. The thus treated sides of the bonding layer 17 are adhered to the adjacent sides of the members 15 and 16 by set films 18 and 19 of the above mentioned cement.

Figure 3:
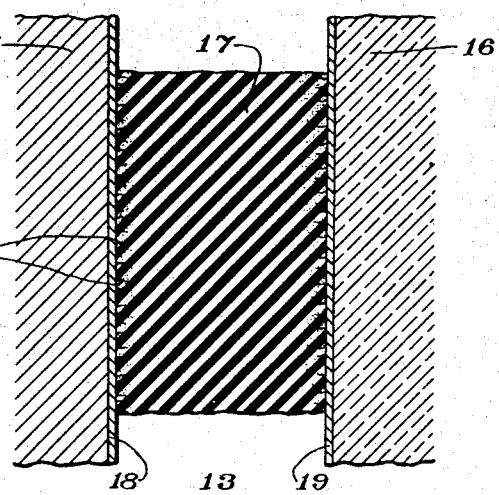
Fig. 3 is an enlarged fragmentary sectional view of the bonding layer shown in Fig. 2 and taken on the line 3—3 of the latter figure.

As illustrated in the enlarged sectional view shown in Fig. 3, the concentration of cyclized rubber 13 at the exterior of the bonding layer 17 is much higher than the concentration of cyclized rubber in the interior of the bonding layer. This decreasing of a concentration of cyclized rubber inwardly of the bonding layer results, it is believed, from the in situ isomerization of rubber and produces an integral union between the exterior crust-like film of substantially pure cyclized rubber and the body of the vulcanized rubber sheet. Consequently, parting of the cyclized rubber film from the vulcanized rubber bonding sheet does not occur under stresses substantially greater than those required to part the body of the rubber sheet. This figure also shows the cracks 12' of the crazed cyclized surface to be filled with set cement which securely coheres particles of the set film together and to the underlying rubber body.

In the foregoing illustration of the improved bonding process, reference has been made mainly to a bonding layer or body comprising isomerized or cyclized natural rubber compounds. Substantially equally satisfactory results may be obtained by using in the foregoing process, in place of natural rubber compounds, synthetic rubber-like compounds such as neoprene, which is polymerized chloroprene, or Buna rubber such as copolymers of butadiene and acrylic nitrile or styrene in a physical state corresponding to vulcanized rubber. Buna rubber may be converted to a state corresponding to vulcanized natural rubber by a vulcanizing action substantially identical to that used in vulcanizing natural rubber while neoprene can be hardened to a desired degree of yieldable firmness by polymerizing it with heat and suitable polymerizing agents and polymerization accelerators. Inasmuch as both of these synthetic rubber compounds are available on the open market in a state corresponding to that of vulcanized natural rubber, it is not believed to be necessary to herein set forth details of the process by which they are formed and such products are accordingly, herein and in the claims appended hereto, referred to as vulcanized synthetic rubber-like materials, vulcanized neoprene and vulcanized Buna rubber.

Surfaces of bodies or sheets comprising synthetic rubber-like compounds of the above class may be prepared for bonding by applying thereon a cyclizing or isomerizing agent selected from the group consisting of sulphuric acid, hydrochloric acid and perchloric acid in the same manner as the surfaces of natural rubber compounds and the resulting cyclized formation varies in cyclized content from a maximum concentration at the exterior of the surface to a minimum concentration at the interior of the yieldable body or layer. The cyclized synthetic rubber-like material is therefore integrally united with the yieldable body or layer without a distinct line of demarcation, much in the same manner as is the cyclized rubber of a body of natural rubber.

Although but several specific embodiments of the invention are herein shown and described, it will be understood that various changes in the sequence of operations, steps and material employed may be made without departing from the spirit of the invention.

We claim:

1. A composite article including a body of vulcanized rubber and an adjacent second body, a crazed film of cyclized rubber on the surface of said rubber body adjacent said second body and a set film of cement between and bonded to said second body and said cyclized rubber film having integral portions penetrating the latter for bonding the particles of said crazed cyclized film to each other and to the uncyclized rubber adjacent said cyclized rubber film, said cement consisting of a mixture of water-insoluble hydrolysis modified polyvinyl acetate resin in which between approximately 14 and 50 mole percent of the acetyl groups of the polyvinyl acetate resin have been replaced by hydroxyl groups and phenol formaldehyde resin.

2. In the manufacture of composite structures, including a vulcanized rubber member bonded to a second member, the method of bonding parts of such structures together which comprises the steps of cyclizing the surface of said rubber member to be bonded to said second member by treating said rubber surface with sulphuric acid, flexing said rubber member in order to craze said cyclized surface, and bonding said crazed cyclized surface to said second member while simultaneously bonding the particles of said crazed surface to each other and to the interior uncyclized portion of said rubber member by heat curing under pressure between said cyclized rubber film and said second member a cement comprising a mixture of water-insoluble hydrolysis modified polyvinyl acetate resin in which between approximately 14 and 50 mole percent of the acetyl groups of the polyvinyl acetate resin have been replaced by hydroxyl groups and phenol formaldehyde resin cements.

3. A composite article including a body of cured rubber-like material and an adjacent second body, a crazed film comprising said rubber-like material in cyclized state on the surface of said rubber-like body adjacent said second body, and a set film of cement between and bonded to said second body and said cyclized film having integral portions penetrating the latter for bonding the particles of said crazed cyclized film to each other and to the uncyclized rubber-like material adjacent said cyclized film and comprising a mixture of water-insoluble hydrolysis modified polyvinyl acetate resin in which between approximately 14 and 50 mole percent of the acetyl groups of the polyvinyl acetate resin have been replaced by hydroxyl groups and a phenol formaldehyde resin.

4. In the manufacture of composite structures, including a cured rubber-like member bonded to a second member, the method of bonding parts of such structures together which comprises the steps of cyclizing the surface of said rubber-like member to be bonded to said second member by treating said surface with sulphuric acid, flexing said rubber-like member in order to craze said cyclized surface, and bonding said crazed cyclized surface to said second member while simultaneously bonding the particles of said crazed surface to each other and to the interior uncyclized portion of said rubber-like member by applying on said cyclized surface and the surface to which it is to be bonded a resin cement having a volatile vehicle and comprising a mixture of water-insoluble hydrolysis modified polyvinyl acetate resin in which between approximately 14 and 50 mole percent of the acetyl groups of the polyvinyl acetate resin have been replaced by hydroxyl groups and a phenol formaldehyde resin, removing the volatile vehicle from said cement coated surfaces, and heat curing the resulting dried cement while said surfaces are held together under pressure.

SEYMOUR G. SAUNDERS.
HARRY MORRISON.

REFERENCES CITED

The following references are of record in the file of this patent:

UNITED STATES PATENTS

| Number | Name | Date |
| --- | --- | --- |
| 2,021,371 | Manchester | Nov. 19, 1935 |
| 2,341,398 | Strother | Feb. 8, 1944 |
| 260,441 | Woodward | July 4, 1882 |
| 2,078,911 | Merrill | Apr. 27, 1937 |
| 2,111,006 | Robie | Mar. 15, 1938 |